United States Patent Office 3,152,127
Patented Oct. 6, 1964

3,152,127
GUANIDINO s-TRIAZINES
Alfred R. Sallmann and Rudolf Pfister, both of Basel, Switzerland, assignors to Geigy Chemical Corporation, Ardsley, N.Y., a corporation of Delaware
No Drawing. Filed Oct. 30, 1961, Ser. No. 148,744
Claims priority, application Switzerland Oct. 31, 1960
7 Claims. (Cl. 260—249.5)

The subject of the present invention is a process for the production of new s-triazine compounds which have valuable properties.

These compounds correspond to the general Formula I

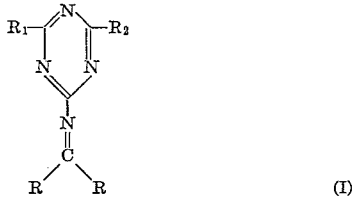

wherein R represents a primary amino group, a low monoalkylamino or dialkylamino group or an ethyleneimino group, and
$R_1$ and $R_2$ independently of each other represent a chlorine atom, a primary amino group, a low monoalkylamino or dialkylamino group or an ethyleneimino group, whereby at least one of these radicals R, $R_1$ and R is an ethyleneimino group.

Surprisingly, compounds of the general Formula I have a restrictive effect on the growth of tissue in the living organism of mice and rats. For example the development of Ascites carcinoma in the mouse is inhibited. Also, for example, there is a restrictive action in the case of carcinoma 1025 and Walker carcinosarcoma. Compounds of the general Formula I wherein R represents the ethyleneimino or a lower dialkylamino group and $R_1$ and R independently of each other each represents chlorine, the ethyleneimino or a lower dialkylamino group have been found to be of specific interest because of their restrictive action on tissue growth.

The compounds of Formula I are produced by reacting tetrameric cyanogen chloride of Formula II.

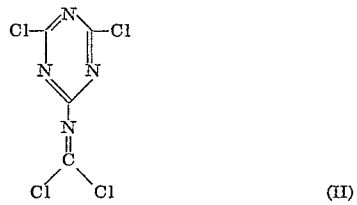

in the presence of an acid binding agent with two mols of ethyleneimine, ammonia or a mono- or di-alkylamine. In this reaction, the two chlorine atoms in the side chain react to form a substituted dichloro-s-triazine derivative of the following Formula III

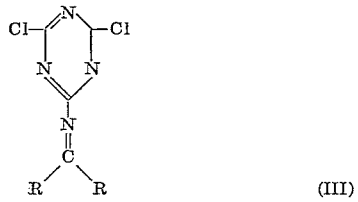

wherein R has the meaning given in Formula I.

The chlorine atoms of these s-triazine derivatives can be further substituted if desired. This is done in steps in any order desired by reacting the compounds of the general Formula III in the presence of an acid binding agent with 1 or 2 mols of ethyleneimine, ammonia or a mono- or di-alkylamine. In this way, with replacement of one of the nuclearly bound chlorine atoms, first compounds of the general Formula IV

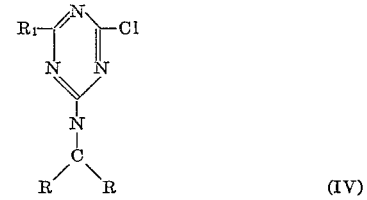

are formed wherein R and $R_1$ have the meanings given in Formula I, in which also the last chlorine atom present can be replaced by the radical $R_2$. The compounds of the general Formulae III and IV are also embraced by the definition as given under Formula I.

The tetrameric cyanogen chloride used as starting material of Formula II is formed on catalytic polymerisation of cyanogen chloride in organic solvents, e.g. in aliphatic ethers. The 4 chlorine atoms in this compound have differing mobility. The two chlorine atoms in the side chain are substituted already in the cold; those in the nucleus are substituted in steps at about 15–50° to about 100° by nucleophilic radicals. Ethyleneimino, amino, mono- and di-alkylamino radicals can be employed as such nucleophilic radicals for the reaction according to the invention.

In addition to the ethyleneimino and the amino group, examples of R, $R_1$ and $R_2$ are: the mono- and di-methylamino group, mono- and di-ethylamino group, the mono- and di-n-propylamino group, mono- and di-n-butylamino group, the mono- and di-n-amylamino group, the mono- and di-isopropylamino group, also the methylethylamino, methylpropyl- (n- or iso-) amino groups and the methylbutyl- (n-, iso-, sec.- or tert.-) amino groups.

As defined, at least one of the radicals R, $R_1$ and $R_2$ in compounds of the general Formula I is an ethyleneimino radical.

If the chlorine atoms in compounds of Formula II are to be replaced by amines, then an excess of amine can be used as acid binding agent. In this case, substantially double the molar amount of amine is used per chlorine atom to be exchanged. However, a tertiary organic base such as, e.g. trimethylamine, triethylamine, di-isopropylethylamine, pyridine, dimethyl aniline or 1-phenyl-2,3-dimethyl-pyrazolone-(5) is preferred as acid binding agent.

The reaction is performed advantageously in an inert organic solvent, e.g. in benzene or diethyl ether.

If the substituent $R_1$ is identical with R or if $R_2$ is identical with $R_1$, then the introduction of R and $R_1$ or of $R_1$ and $R_2$ is performed advantageously in the same step using corresponding amounts of starting materials.

Most of the compounds according to the invention of the general Formula I are soluble in the usual solvents and also in water. Acids easily cause a polymerization; on the other hand, buffered aqueous solutions of such compounds having a neutral to weakly alkaline reaction, e.g., solutions in 0.125 molar phosphate buffer solution according to Soerensen (pH 7.4) are stable.

The following examples serve to illustrate the process according to the invention. The temperatures are given in degrees centigrade. Where parts are mentioned in the examples the relationship of parts by weight to parts by volume is as that of grammes to cubic centimetres. Grammes have been written "g." throughout.

EXAMPLE 1

2-(N,N,N',N'-Bis-Ethylene-Guanidino)-4,6-Bis-Ethylene-Imino-s-Triazine

The solution of 2.5 parts of tetrameric cyanogen chloride in 20 parts by volume of anhydrous ether is slowly added dropwise while quickly stirring to a solution of 1.72 parts of ethyleneimine and 4.1 parts of triethylamine in 30 parts by volume of anhydrous ether. During the reaction, external cooling to −5° C. is applied to the mixture by means of a mixture of ice and sodium chloride and a dry stream of nitrogen is passed through the reaction vessel.

The dropwise addition is completed within 30 minutes and the mixture is stirred for another 30 minutes at −5°. The crystals which precipitate are filtered off and extracted twice with 500 parts by volume of warm anhydrous ether each time. The extract is filtered in an atmosphere of nitrogen and the filtrate is concentrated in vacuo whereupon the 2-(N,N',N'-bis-ethylene-guanidino)-4,6-bis-ethyleneimino-s-triazine crystallises out. It recrystallises from benzene/ether in prisms which decompose at 115–116°.

EXAMPLE 2

*2-(N,N,N',N'-Bis-Ethylene-Guanidino)-4,6-Bis-Ethyleneimino-s-Triazine*

2.5 parts of tetrameric cyanogen chloride dissolved in 20 parts by volume of anhydrous benzene are slowly added dropwise while stirring to a solution of 1.75 parts of ethylene-imine and 4.2 parts of triethylamine in 40 parts by volume of anhydrous benzene. The temperature is kept at, at the most, +10° by external cooling and during the reaction, nitrogen is passed through the reaction vessel.

The dropwise addition is completed within 15 minutes and the mixture is stirred for another 60 minutes at +7°. The triethylamine hydrochloride is then filtered off in an atmosphere of nitrogen and the filtrate is concentrated in vacuo at 40°. On adding ether, the 2-(N,N,N',N'-bis-ethylene-guanidino)-4,6-bis-ethyleneimino-s-triazine crystallises out in beautiful prisms.

Recrystallised from anhydrous benzene/ether, it melts on decomposition at 114–116°.

EXAMPLE 3

*2-(N,N,N',N'-Bis-Ethylene-Guanidino)-4,6-Dichloro-s-Triazine*

A solution of 3.46 g. of ethyleneimine and 10.4 g. of di-isopropylethylamine in 100 ml. of abs. ether are slowly added dropwise while stirring well and introducing dry nitrogen to a solution of 9.84 g. of tetramic cyanogen chloride in 100 ml. of abs. ether. During the addition, the temperature is kept at −35°. The addition is complete after 30 minutes and then the mixture is stirred for 60 minutes at −30°. Precipitated crystals are then filtered off and extracted twice with 100 ml. of benzene each time. The combined benzene extracts are washed three times with 30 ml. of water each time and dried over potash. The benzene solution is then concentrated under reduced pressure at 40°, whereupon 2-(N,N,N',N'-bis-ethylene-guanidino)-4,6-dichloro-s-triazine crystallises out. When recrystallised from benzene/ether, it decomposes at 90°.

EXAMPLE 4

*2-(N,N,N',N'-Bis-Ethylene-Guanidino)-4-Ethyleneimino-6-Chloro-s-Triazine*

A solution of 3.12 g. of ethyleneimine and 9.08 g. of di-isopropylethylamine in 20 ml. of abs. ether is added dropwise to a solution of 4.92 g. of tetrameric cyanogen chloride in 60 ml. of abs. benzene/abs. ether (3:1) while stirring well. During the reaction, the mixture is cooled to −10° and a stream of dry nitrogen is bubbled through the vessel. The addition lasts 20 minutes. The whole is stirred for another 3 hours at −10°. The precipitated crystals are filtered off, and the filtrate is washed three times with 20 ml. of water each time. The solution is dried over potash and concentrated in vacuo at 40°. The oily residue is dissolved in a little benzene and, after addition of ether, the 2-(N,N,N',N'-bis-ethylene-guanidino)-4-ethyleneimino-6-chloro-s-triazine crystallises out. Recrystallised from benzene/ether, the compound melts at 95–97° on decomposition.

EXAMPLE 5

*2-(N,N,N',N'-Bis-Ethylene-Guanidino)4,6-Bis-Dimethylamino-s-Triazine*

A solution of 2.59 g. of 2-(N,N,N',N'-bis-ethylene-guanidino)-4,6-dichloro-s-triazine in 10 ml. of dioxan is stirred into 30 ml. of a water/ice mixture 1:1. 5 g. of 30% aqueous dimethylamine solution are added dropwise to the finely distributed suspension. During the addition the temperature is kept at +5°. A solution of 2.76 g. of potassium carbonate in 6 ml. of water is then added whereupon the suspension partly dissolves. The solution is stirred for 2 hours at 25° and then for 30 minutes at 50°. The solution is filtered and the filtrate is extracted three times with 40 ml. of chloroform each time. The combined chloroform extracts are dried over potash and evaporated in vacuo at 30°. The residue is dissolved in a little anhydrous benzene and, after the addition of ether, the 2-(N,N,N',N'-bis-ethylene-guanidino)-4,6 - bis - dimethylamino-s-triazine crystallises out. The compound melts at 126–128° on decomposition. It is soluble in the usual organic solvents and in water.

EXAMPLE 6

*2-(N,N,N',N'-Tetraethyl-Guanidino)-4,6-Bis-Ethyleneimino-s-Triazine*

A solution of 6.38 g. of 2-(N,N,N',N'-tetraethylguanidino)-4,6-dichloro-s-triazine in 15 ml. of dioxan is stirred into a mixture of 30 g. of ice and 30 ml. of water whereupon a fine suspension is formed. A solution of 2.6 g. of ethyleneimine and 2.8 g. of potassium carbonate in 30 ml. of water is slowly added. The temperature is kept at 10° during the addition. The addition lasts 30 minutes whereupon the whole is stirred for 2 hours at 40°. Undissolved components are filtered off and the filtrate is extracted four times with 50 ml. of chloroform each time. The combined chloroform extracts are dried over potash and evaporated in vacuo at 40°. The 2-(N,N,N',N'-tetraethyl-guanidino)-4,6-bis-ethyleneimino-s-triazine is obtained as a yellowish, viscous oil which cannot be crystallised from any of the usual solvents. With Nujol, the infra-red spectrum shows bands at $6.02\mu$, $6.60\mu$ and $12.58\mu$.

Decomposition occurs on heating at over 50°. The compound dissolves in benzene, methylene chloride and also in the usual solvents and water.

What we claim is:

1. 2 - (N,N,N',N'-bis-ethylene-guanidino)-4,6-bis-(lower dialkylamino)-s-triazine.
2. 2 - (N,N,N',N'-bis-ethylene-guanidino)-4-(lower dialkylamino)-6-ethyleneimino-s-triazine.
3. 2 - (N,N,N',N'-bis-ethylene-guanidino)-4-(lower dialkylamino)-6-chloro-s-triazine.
4. 2 - (N,N,N',N' - bis-ethylene-guanidino)-4,6-bis-ethyleneimino-s-triazine.
5. 2 - (N,N,N',N' - bis-ethylene-guanidino)-4,6-dichloro-s-triazine.
6. 2 - (N,N,N',N' - bis-ethylene-guanidino)-4-ethyleneimino-6-chloro-s-triazine.
7. 2 - (N,N,N',N' - bis-ethylene-guanidino)-4,6-bis-dimethyl-amino-s-triazine.

References Cited in the file of this patent

UNITED STATES PATENTS

| | | |
|---|---|---|
| 2,537,834 | Kaiser et al. | Jan. 9, 1951 |
| 3,050,461 | Luvisi | Aug. 21, 1962 |
| 3,053,843 | Gysin et al. | Sept. 11, 1962 |
| 3,073,851 | Steiger | Jan. 15, 1963 |

OTHER REFERENCES

Schaefer et al.: Journal of the American Chemistry Society, vol. 77, pp. 5915–5930 (1955).